United States Patent
Kyosti et al.

(10) Patent No.: US 9,742,508 B1
(45) Date of Patent: Aug. 22, 2017

(54) SYSTEMS AND METHODS FOR CALIBRATING MULTIPLE INPUT, MULTIPLE OUTPUT (MIMO) TEST SYSTEMS AND FOR USING THE CALIBRATED MIMO TEST SYSTEMS TO TEST MOBILE DEVICES

(71) Applicant: Keysight Technologies, Inc., Minneapolis, MN (US)

(72) Inventors: Pekka Kyosti, Jokirinne (FI); Lassi Hentila, Kempele (FI); Jukka Kyrolainen, Oulu (FI); Ville Tuomo Petteri Heino, Oulu (FI)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/054,847

(22) Filed: Feb. 26, 2016

(51) Int. Cl.
   H04B 17/12      (2015.01)
   H04B 7/0413     (2017.01)
   H04B 17/21      (2015.01)
   H04B 17/29      (2015.01)

(52) U.S. Cl.
   CPC .......... *H04B 17/12* (2015.01); *H04B 7/0413* (2013.01); *H04B 17/21* (2015.01); *H04B 17/29* (2015.01)

(58) Field of Classification Search
   CPC ...... H04B 17/21; H04B 17/29; H04B 7/0413; H04B 17/12; H04W 24/06
   See application file for complete search history.

(56) References Cited

U.S. PATENT DOCUMENTS

| | | | |
|---|---|---|---|
| 8,811,461 B1 | 8/2014 | Huynh | |
| 2011/0299570 A1* | 12/2011 | Reed | H04B 7/0434 375/130 |
| 2012/0207030 A1* | 8/2012 | Luong | H04W 24/06 370/245 |
| 2013/0303089 A1* | 11/2013 | Wang | H04W 24/06 455/67.12 |
| 2014/0087668 A1* | 3/2014 | Mow | H04W 24/00 455/67.14 |
| 2015/0025818 A1* | 1/2015 | Das | H04W 24/10 702/58 |
| 2015/0280844 A1 | 10/2015 | Yu et al. | |

OTHER PUBLICATIONS

Yu, et al., "Radiated Two-Stage Method for LTE MIMO User Equipment Performance Evaluation", IEEE Transactions on Electromagnetic Compatability vol. 56, No. 6, p. 1691-1696, Dec. 2014.
Rumney, et al., "Advances in Antenna Pattern-Based MIMO OTA Test Methods", 2015 9th European Conference on Antennas and Propagation (EuCAP), Lisbon, Apr. 13-17, 2015.

\* cited by examiner

*Primary Examiner* — Syed Haider (57) ABSTRACT

MIMO test systems and methods are provided that eliminate the need for a wired connection between the test system and the antenna ports of the DUT, thereby eliminating the need to open up the housing of the DUT and risk damaging or destroying it. The MIMO test systems and methods also eliminate the need for an anechoic chamber, thereby eliminating the cost and space requirements associated therewith. A suitable non-anechoic, electromagnetically-shielded chamber can be used in the test system that is much less expensive and that has a much smaller spatial footprint than a typical anechoic chamber used in MIMO test systems.

40 Claims, 7 Drawing Sheets

SYSTEMS AND METHODS FOR CALIBRATING MULTIPLE INPUT, MULTIPLE OUTPUT (MIMO) TEST SYSTEMS AND FOR USING THE CALIBRATED MIMO TEST SYSTEMS TO TEST MOBILE DEVICES

BACKGROUND

In multiple input multiple output (MIMO) communications systems, multiple antennas are used on both the base station and on the mobile device to exploit a phenomenon known as multipath propagation in order to achieve higher data rates. In general, MIMO communications systems simultaneously send and receive multiple data signals over each radio channel. The multipath propagation phenomenon is the result of environmental factors that influence the data signals as they travel between the base station and the mobile device, including, for example, ionospheric reflection and refraction, atmospheric ducting, reflection from terrestrial objects and reflection from bodies of water. Because of these factors, the data signals experience multipath interference that results in constructive interference, destructive interference, or fading, and phase shifting of the data signals. MIMO technology has been standardized in various wireless communications standards including Institute of Electrical and Electronics Engineers (IEEE) 802.11n, IEEE 802.11ac, HSPA+ (3G), WiMAX (4G) and Long Term Evolution (LTE) standards.

MIMO communications systems require testing. A typical MIMO test system for testing a mobile device under test (DUT) includes a base station emulator, a fading emulator, the mobile device under test (DUT), a personal computer (PC), some type of multi-probe configuration, and various electrical cables for interconnecting the components. In some MIMO test systems, the output ports of the fading emulator are connected to the antenna ports of the mobile DUT by electrical cables. This type of MIMO test system is known as a conducted MIMO test system. A disadvantage of this type of MIMO test system is that the mobile DUT has to be opened up, and in some cases broken, in order to access the antenna ports. The antenna connectors in the antenna ports are typically fragile and easily broken. Also, connecting the electrical cables to the antenna ports can be time consuming and can detrimentally impact the electrical performance of the mobile DUT. In addition, some mobile DUTs do not have antenna connectors in the antenna ports, and therefore cannot be tested using a conducted MIMO test system.

Another type of MIMO test system that is used to test mobile DUTs is a multi-probe anechoic chamber (MPAC) over-the-air (OTA) test system. In a typical MPAC OTA system, the mobile DUT is located inside of an anechoic chamber that includes a multi-antenna probe configuration. The output ports of the fading emulator are connected to the respective antenna probes of the chamber. This type of test system is currently the best available in terms of performance testing, but has drawbacks in terms of cost and space requirements. The anechoic chamber is expensive and typically requires at least ten square meters of floor space to employ. Also, the multi-antenna probe configuration typically utilizes many probe antennas and the fading emulator must have many channels to feed the probe antennas, which leads to high costs.

Another known MIMO test system uses a radiated two-stage methodology. The test set up is similar to that of the MPAC OTA set up. In the first stage, the mobile DUT is located inside of an anechoic chamber and its radiation pattern is measured. In the second stage, the mobile DUT is placed inside of another chamber that is equipped with N probe antennas, where N is a positive integer that is greater than or equal to two. During the second stage, the N×N transfer function for the N probe antennas and the N antennas of the mobile DUT is measured and its inverse multiplied by the channel model being emulated by the fading emulator. The performance of the test is about the same as that of the conducted MIMO test, but without the need for the cable connection to the antenna probes of the mobile DUT. The mobile DUT must be able to support a special mode that allows it to wirelessly communicate with the other test equipment of the system during testing, which is a disadvantage of this test system. Another disadvantage of this test system is that measuring the radiation pattern of the mobile DUT is a very time consuming process and requires the use of a costly anechoic chamber.

A need exists for a robust MIMO test system and method that eliminate the need to make wired connections to the antenna ports of the mobile DUT, that eliminate the need to use an anechoic chamber and the costs associated with it, that can be implemented in a relatively small area, and that can be set up and performed relatively quickly and easily.

SUMMARY

The present embodiments are directed to test systems and methods for testing a DUT in a MIMO mode. The test system, in accordance with an embodiment, comprises a base station (BS) or BS emulator, a fading emulator, a non-anechoic, electromagnetically-shielded chamber, a plurality of probe antennas disposed in the chamber, and a computer. The BS or BS emulator is configured to output a plurality of time-varying (T-V) signals. The fading emulator is electrically coupled to the BS or BS emulator to receive the T-V signals output from the BS or BS emulator at respective input ports of the fading emulator. The fading emulator performs fading simulation operations on the inputted T-V signals to produce a plurality of faded T-V signals that are output from the fading emulator over respective output ports of the fading emulator. The non-anechoic, electromagnetically-shielded chamber is electrically coupled to the fading emulator to receive the faded T-V signals from the fading emulator. The DUT is disposed in the chamber and has a plurality of antenna elements electrically coupled to respective antenna ports of the DUT. The probe antennas emit respective radio frequency (RF) signals in response to being driven by the faded T-V signals. The computer is in communication with the DUT without a wired connection to the antenna ports of the DUT. The computer receives information relating to measurements of power received by the antenna elements of the DUT, processes the received information to calibrate the test system and then causes the DUT to be tested by the calibrated test system to determine at least one performance criteria of the DUT.

Eliminating the need for a wired connection between the antenna ports of the DUT and the test system eliminates the need to open up the housing of the DUT and risk damaging or destroying it. Eliminating the need for an anechoic chamber eliminates the cost and space requirements associated therewith. A suitable non-anechoic, electromagnetically-shielded chamber can be used in the test system that is much less expensive and that has a much smaller spatial footprint than a typical anechoic chamber used in known MIMO test systems.

In accordance with another embodiment, the test system comprises a BS or BS emulator, a fading emulator, a non-anechoic, electromagnetically-shielded chamber, a plurality of probe antennas disposed in the chamber, a switching device electrically coupled to the output ports of the fading emulator and to the probe antennas, and a computer. The BS or BS emulator configured to output a plurality of time-varying (T-V) signals. The fading emulator is electrically coupled to the BS or BS emulator to receive the T-V signals output from the BS or BS emulator at respective input ports of the fading emulator. The fading emulator performs fading simulation operations on the inputted T-V signals to produce a plurality of faded T-V signals that are output from respective output ports of the fading emulator. The DUT is disposed in the chamber and has a plurality of antenna elements electrically coupled to respective antenna ports of the DUT. The probe antennas emit respective RF signals in response to being driven by the faded T-V signals. The switching device selects a set of the faded T-V signals output from the fading emulator to be provided to a subset of the probe antennas. The computer is in communication with the DUT and with the switching device and receives information relating to measurements of power received by the antenna elements of the DUT and measured throughput of the DUT. The computer performs a calibration process that causes the switching device to select different sets of the faded T-V signals to be provided to different subsets of the probe antennas while determining merits of each set based on the information. The computer causes actual testing of the DUT to be performed using a selected one of the sets.

These and other features and advantages will become apparent from the following description, claims and drawings.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as a computer having one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Figure 1:
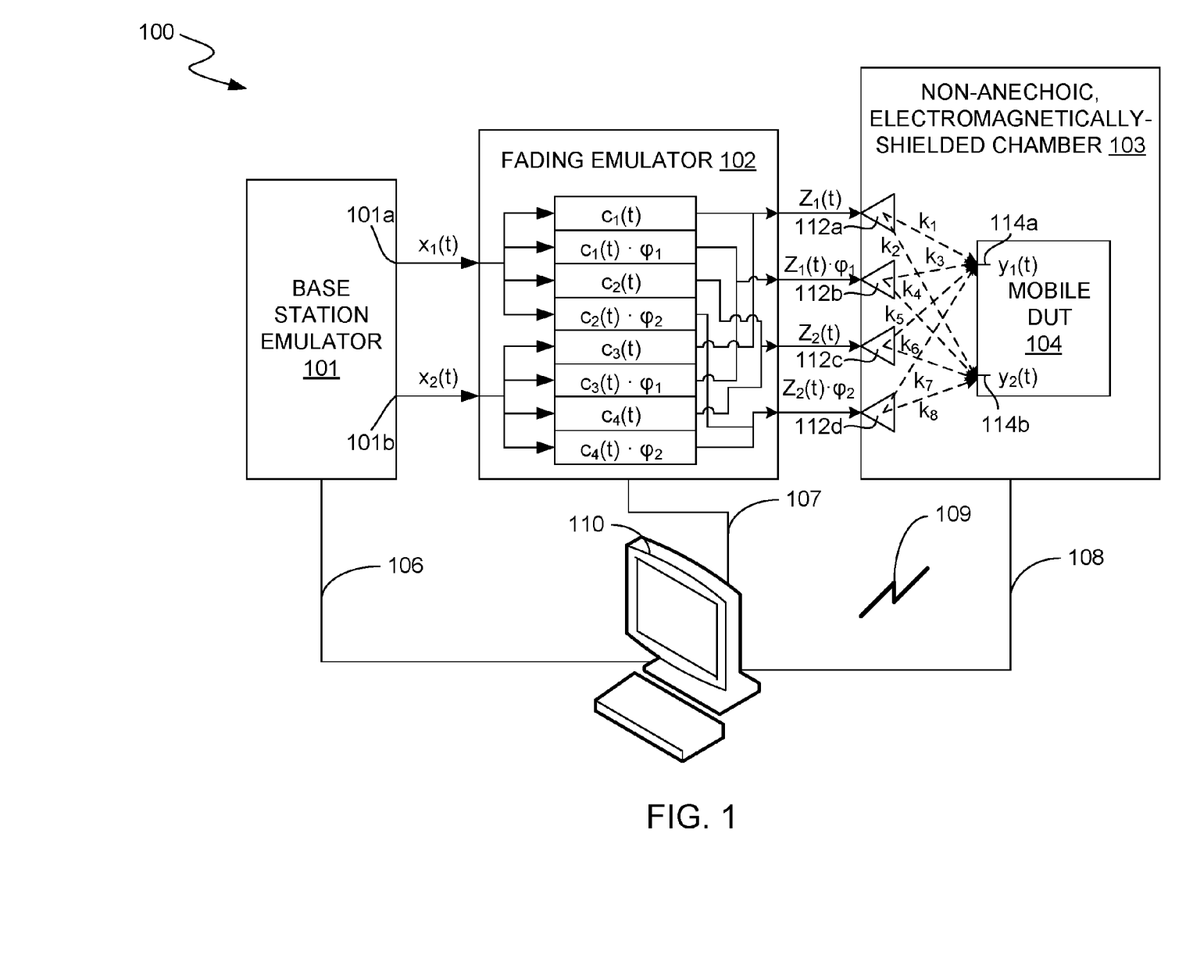
FIG. 1 is a schematic block diagram illustrating a MIMO test system in accordance with an illustrative embodiment.

FIG. 1 illustrates a block diagram of the MIMO test system 100 in accordance with an exemplary, or illustrative, embodiment. In accordance with this illustrative embodiment, the MIMO test system 100 comprises a base station emulator 101, a fading emulator 102, a non-anechoic, electromagnetically-shielded chamber 103, and a computer 110, which may be, for example, a PC. A mobile DUT 104 is disposed inside of the chamber 103. The computer 110 is electrically coupled by electrical cables 106 and 107 to the base station emulator 101 and to the fading emulator 102, respectively.

The computer 110 is in communication with the mobile DUT 104 via either a wired communication link, represented by line 108, or a wireless communication link, represented by wireless symbol 109. Importantly, it is not necessary to make any connections to antenna connectors (not shown) of the mobile DUT 104. Therefore, there is no need to open up the housing of the mobile DUT 104 and risk damaging or destroying it. In the case of a wired communication link being used between the computer 110 and the mobile DUT 104, opposite ends of one or more electrical cables are connected to an input/output (I/O) port on the mobile DUT 104 and to an I/O port on the computer 110. The I/O ports of the mobile DUT 104 and of the computer 110 may be, for example, Universal Serial Bus (USB) ports.

In accordance with this illustrative embodiment, the base station emulator 101 has M output ports for outputting M time-varying radio frequency (RF) signals, where M is a positive integer that is greater than or equal to 2 and represents the number of antennas that the base station emulator 101 is emulating. In the illustrative embodiment shown in FIG. 1, M=2, i.e., the base station emulator 101 has first and second output ports 101a and 101b over which first and second time-varying RF signals, $x_1(t)$ and $x_2(t)$, respectively, are output from the base station emulator 101. The fading emulator 102 has M input ports for inputting the first and second time-varying RF signals, $x_1(t)$ and $x_2(t)$, respectively. The fading emulator 102 has a number of channels over which the first and second time-varying RF signals $x_1(t)$ and $x_2(t)$ pass. As the first and second time-varying RF signals $x_1(t)$ and $x_2(t)$ pass along these channels, they are operated on in a predetermined manner using a plurality of fading coefficients $c_1(t)$, $c_2(t)$, $c_3(t)$ and $c_4(t) \cdot \phi_2$, and a plurality of phase-shifted versions of these coefficients, $c_1(t) \cdot \phi_1$, $c_2(t) \cdot \phi_2$, $c_3(t) \cdot \phi_1$ and $c_4(t) \cdot \phi_2$, respectively. The fading emulator 102 has N output ports, where N is a positive integer that is greater than or equal to 2. In accordance with this illustrative embodiment, N=4, and thus four faded, time-varying signals, $Z_1(t)$, $Z_1(t) \cdot \phi_1$, $Z_2(t)$ and $Z_2(t) \cdot \phi_2$ are output from the respective output ports of the fading emulator 102. The manner in which fading emulators perform fading operations is well known and therefore will not be described in detail herein in the interest of brevity.

In accordance with this illustrative embodiment, the non-anechoic, electromagnetically-shielded chamber 103 has N probe antennas 112a-112d positioned in predetermined spatial relationships relative to the mobile DUT 104. In accordance with this illustrative embodiment, the number of probe antennas 112a-112d equals the number of output ports of the fading emulator 102 and each probe antenna 112a-112d is modulated by one of the faded, time-varying signals $Z_1(t)$, $Z_1(t) \cdot \phi_1$, $Z_2(t)$ and $Z_2(t) \cdot \phi_2$, respectively.

The mobile DUT 104 has P antenna elements 114a-114b, where P is a positive integer that is greater than or equal to 2. In accordance with this illustrative embodiment, P=M, and thus the mobile DUT 104 has two antenna elements 114a and 114b. The signals that are received by the antenna elements 114a and 114b of the mobile DUT 104 are represented by mathematical functions $y_1(t)$ and $y_2(t)$. The relationships between the output signals $x_1(t)$ and $x_2(t)$ of the base station emulator 101, the fading coefficients $c_1(t)$-$c_4(t)$ of the fading emulator 102, the output signals $Z_1(t)$, $Z_1(t) \cdot \phi_1$, $Z_2(t)$ and $Z_2(t) \cdot \phi_2$ of the fading emulator 102, the probe antennas 112a-112d of the chamber 103, and the antenna elements 114a and 114b of the mobile DUT 104 can be mathematically expressed as follows:

$$X(t) = \begin{bmatrix} x_1(t) \\ x_2(t) \end{bmatrix}, \quad \text{Equation 1}$$

$$Y(t) = \begin{bmatrix} y_1(t) \\ y_2(t) \end{bmatrix} = H(t)X(t), \quad \text{Equation 2}$$

where H(t) is expressed by as follows:

$$H(t) = \begin{bmatrix} c_1(t)(k_1 + \varphi_1 k_3) + & c_3(t)(k_1 + \varphi_1 k_3) + \\ c_2(t)(k_5 + \varphi_2 k_7) & c_4(t)(k_5 + \varphi_2 k_7) \\ c_1(t)(k_2 + \varphi_1 k_4) + & c_3(t)(k_2 + \varphi_1 k_4) + \\ c_2(t)(k_6 + \varphi_2 k_8) & c_4(t)(k_6 + \varphi_2 k_8) \end{bmatrix}. \quad \text{Equation 3}$$

H(t) is a time-variant channel matrix containing the radio channel model in the fading emulator 102, the static radio channel inside the small chamber 103 (including the probe antennas 112a-112d, multipath propagation and the DUT antenna elements 114a-114b), probe antennas cables (not shown), connectors (not shown), etc. The received signal may also be expressed by the following equation:

$$Y(t) = GZ(t) = \begin{bmatrix} k_1 + \varphi_1 k_3 & k_5 + \varphi_2 k_7 \\ k_2 + \varphi_1 k_4 & k_6 + \varphi_2 k_8 \end{bmatrix} \begin{bmatrix} z_1(t) \\ z_2(t) \end{bmatrix}, \quad \text{Equation 4}$$

where $z_i(t) \in \mathbb{C}$ are the output signals of the fading emulator 102, $\varphi_i \in \mathbb{C}$, $|\phi_i|=1$ are tunable phase terms of the output signals of the fading emulator 102, and $k_i \in \mathbb{C}$ are time-invariant channel coefficients of the propagation paths from the probe antennas 112a-112d to the DUT antenna elements 114a and 114b inside of the chamber 103.

As indicated above, one of the goals of the embodiments described herein is to eliminate the need to make a cable connection to the DUT antenna connectors while also avoiding the need to use an anechoic chamber. This goal can be reached if matrix G in Equation 4 is forced to have a format of the identity matrix, I, which is expressed as follows:

$$G = I. \quad \text{Equation 5:}$$

This condition may be accomplished by tuning the tunable phase terms, $\phi_i$, in a calibration procedure to obtain values for the tunable phase terms that satisfy the condition of Equation 5. The manner in which this is accomplished for the illustrative embodiment shown in FIG. 1 for the tunable phase terms $\phi_1$ and $\phi_2$ will now be described.

Figure 2:
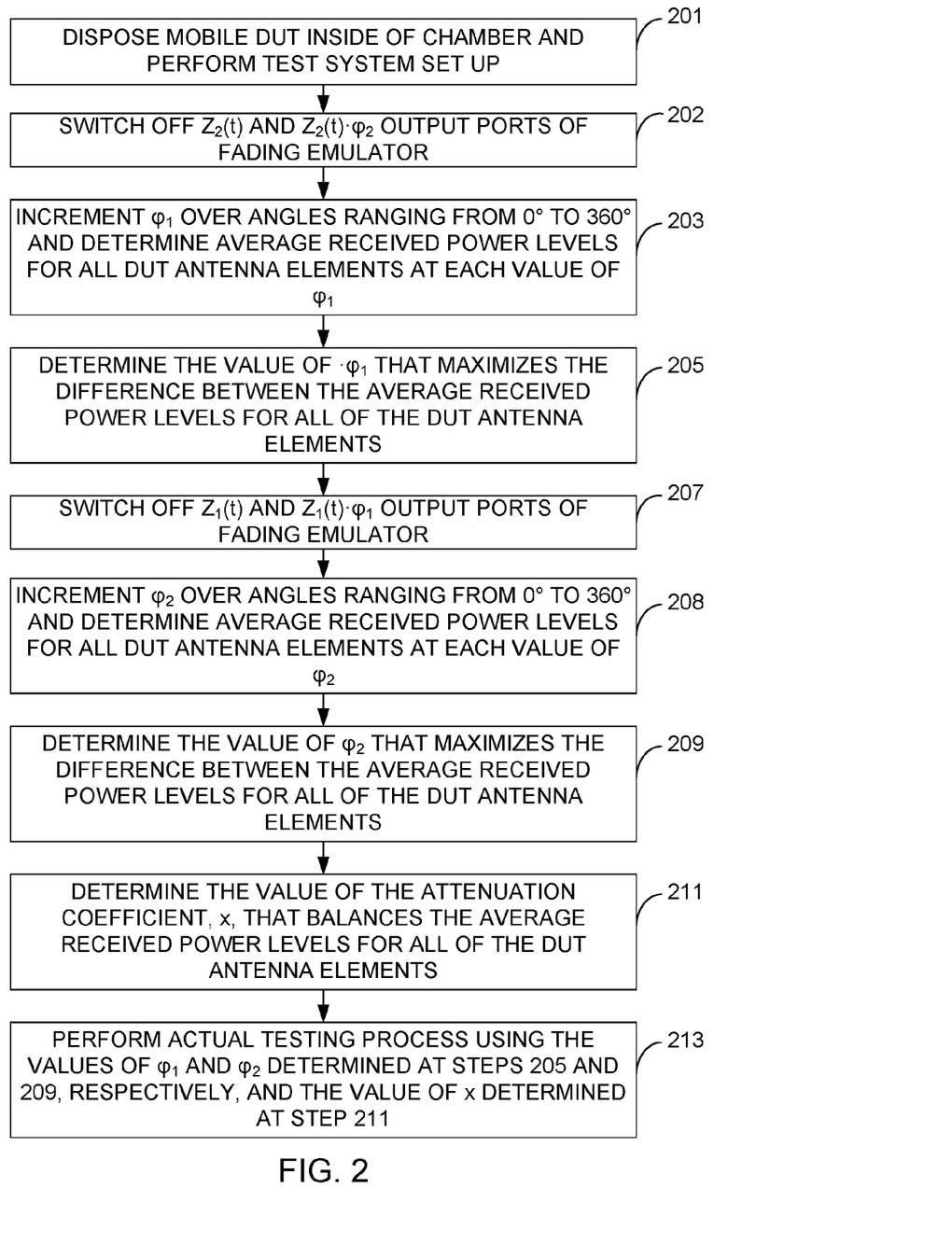
FIG. 2 illustrates a flow diagram that represents the test method performed by the MIMO test system shown in FIG. 1 in accordance with an illustrative embodiment.

FIG. 2 illustrates a flow diagram that represents the test method performed by the MIMO test system 100 shown in FIG. 1 in accordance with an illustrative embodiment. The test method includes a calibration process that is first performed to obtain values to be used for the tunable phase terms and for attenuation coefficients that will be used during the actual testing process. After the calibration process has been performed, the actual testing process is performed using the values for the tunable phase terms and attenuation coefficients obtained during the calibration process. The computer 110 has a combination of hardware (e.g., one or more processors) and software and/or firmware for performing algorithms associated with the calibration and actual testing processes. The calibration and the actual testing processes will now be described with reference to the illustrative embodiment shown in FIG. 2.

The MIMO test system 100 is set up and the mobile DUT 104 is disposed inside of the non-anechoic, electromagnetically-shielded chamber 103, as indicated by block 201. The test set up process includes configuring the fading emulator 102 to emulate a suitable channel model (e.g., a static constant model) and establishing a call session between the mobile DUT 104 and the base station emulator 101. The $Z_2(t)$ and $Z_2(t) \cdot \phi_2$ output ports of the fading emulator 102 are switched off, as indicated by block 202. The tunable phase term $\phi_1$ is incremented over an angular range ranging from 0° to 360° and the average received power level at each value of $\phi_1$ is determined over the entire range for each of the DUT antenna elements 114a and 114b, as indicated by block 203.

The mobile DUT 104 is capable of measuring and reporting its average received power level values for each of the antenna elements 114a and 114b at each angle of $\phi_1$. Typically, the average received power level value is a Reference Signal Received Power (RSRP) value, which is a measurement that is defined in one or more wireless communications standards, such as the LTE standard. The RSRP values are transmitted from the mobile DUT 104 to the computer 110 via the wired or wireless communication links 108 and 109, respectively. The computer 110 executes an algorithm that receives the RSRP values, $RSRP_1$ and $RSRP_2$, for each of the antenna elements 114a and 114b, respectively, at each angle of $\phi_1$. As will be understood by persons of skill in the art, different types of mobile DUTs may report the average received power values in different formats from those used for reporting RSRP values. Persons of skill in the art will also understand, in view of the description provided herein, that the embodiments described herein are not limited with respect to the format in which these values are reported or with respect to the standard with which the mobile DUT 104 complies. For ease of discussion, it will be assumed that the mobile DUT 104 reports RSRP values.

After the $RSRP_1$ and $RSRP_2$ values have been determined for the DUT antenna elements 114a and 114b, respectively, over the entire range of $\phi_1$ values, the computer 110 determines a difference, $\Delta\phi_1$, between the $RSRP_1$ and $RSRP_2$ values as $\Delta\phi_1 = RSRP_1 - RSRP_2$ and a determination is made by the computer 110 as to which $\phi_1$ value resulted in the maximum $\Delta\phi_1$ value, as indicated by block 205.

The $Z_1(t)$ and $Z_1(t) \cdot \phi_1$ output ports of the fading emulator 102 are switched off, as indicated by block 207. The tunable phase term $\phi_2$ is incremented over an angular range ranging from 0° to 360° and the $RSRP_1$ and $RSRP_2$ values at each angle of $\phi_2$ are determined over the entire range for each of the DUT antenna elements 114a and 114b, as indicated by block 208.

After the $RSRP_1$ and $RSRP_2$ values have been determined for the DUT antenna elements 114a and 114b, respectively, over the entire range of $\phi_2$ values, and sent to the computer 110, the computer 110 determines the difference, $\Delta\phi_2$, between the $RSRP_1$ and $RSRP_2$ values as $\Delta\phi_2 = RSRP_1 - RSRP_2$ and determines which $\phi_2$ value resulted in the maximum $\Delta\phi_2$ value, as indicated by block 209.

In the steps represented by blocks 205 and 209, it is practical to store all $\{RSRP_1(\phi_1), RSRP_2(\phi_1), RSRP_1(\phi_2), RSRP_2(\phi_2)\}$ values in a memory device that may be part of the computer 110 or external to and accessible by the computer 110. The computer 110 uses the stored values to find phase values $\phi_i$ by maximizing the following argument given here in the following equation:

$$(\widehat{\varphi_1}, \widehat{\varphi_2}) = \arg\left(\max_{\varphi_1, \varphi_2} |RSRP_1(\varphi_1) - RSRP_2(\varphi_1) - RSRP_1(\varphi_2) + RSRP_2(\varphi)|\right). \quad \text{Equation 6}$$

Having determined the $\phi_1$ and $\phi_2$ values that resulted in the maximum $\Delta\phi_1$ and $\Delta\phi_2$ values, respectively, the value of an attenuation coefficient, x, is determined that balances the $RSRP_1$ and $RSRP_2$ values for either of the output port pairs, $Z_1(t)$ and $Z_1(t) \cdot \phi_1$ or $Z_2(t)$ and $Z_2(t) \cdot \phi_2$, as indicated by block 211. The phase terms $\phi_1$ and $\phi_2$ determined in blocks 205 and 209 are utilized to force matrix G in Equation 5 to have the format of the diagonal matrix (i.e., entries outside of the main diagonal are all zero values). Then, the step represented by block 211 is utilized to balance (i.e., make equal) the diagonal elements of the diagonal matrix G to give it the format of the identity matrix I. The value of the attenuation coefficient, x, may be calculated by the computer 110 on a linear scale using the $\phi_1$ and $\phi_2$ values determined in the steps represented by blocks 205 and 209 using the following equation:

$$x = \frac{RSRP_2(\varphi_1) + RSRP_2(\varphi_2)}{RSRP_1(\varphi_1) + RSRP_1(\varphi_2)}. \quad \text{Equation 7}$$

Having determined the $\phi_1$ and $\phi_2$ values and the value of the attenuation coefficient, x, the actual testing process is performed using these values, as indicated by block 213. During the actual testing process, the fading emulator 102 uses the $\phi_1$ and $\phi_2$ values determined in the steps represented by blocks 205 and 209 to tune the phases of the output signals $Z_1(t) \cdot \phi_1$ and $Z_2(t) \cdot \phi_2$ of the fading emulator 209 and uses the value of the attenuation coefficient x determined at the step represented by block 211 to attenuate the output signals $Z_1(t)$, $Z_1(t) \cdot \phi_1$, $Z_2(t)$ and $Z_2(t) \cdot \phi_2$ of the fading emulator 102. The phase tuning and attenuation processes may be performed by the fading emulator 102 or they may be performed by phase shifting and attenuation devices, respectively, that are external to the fading emulator 102. For purposes of discussion, it will be assumed that the phase tuning and attenuation processes are performed by the fading emulator 102. The attenuation process is performed as follows: if x<1, then the output signals $Z_1(t)$ and $Z_1(t) \cdot \phi_1$ are attenuated by 1/x; if x>1, then the output signals $Z_2(t)$ and $Z_2(t) \cdot \phi_2$ are attenuated by x.

Figure 3:
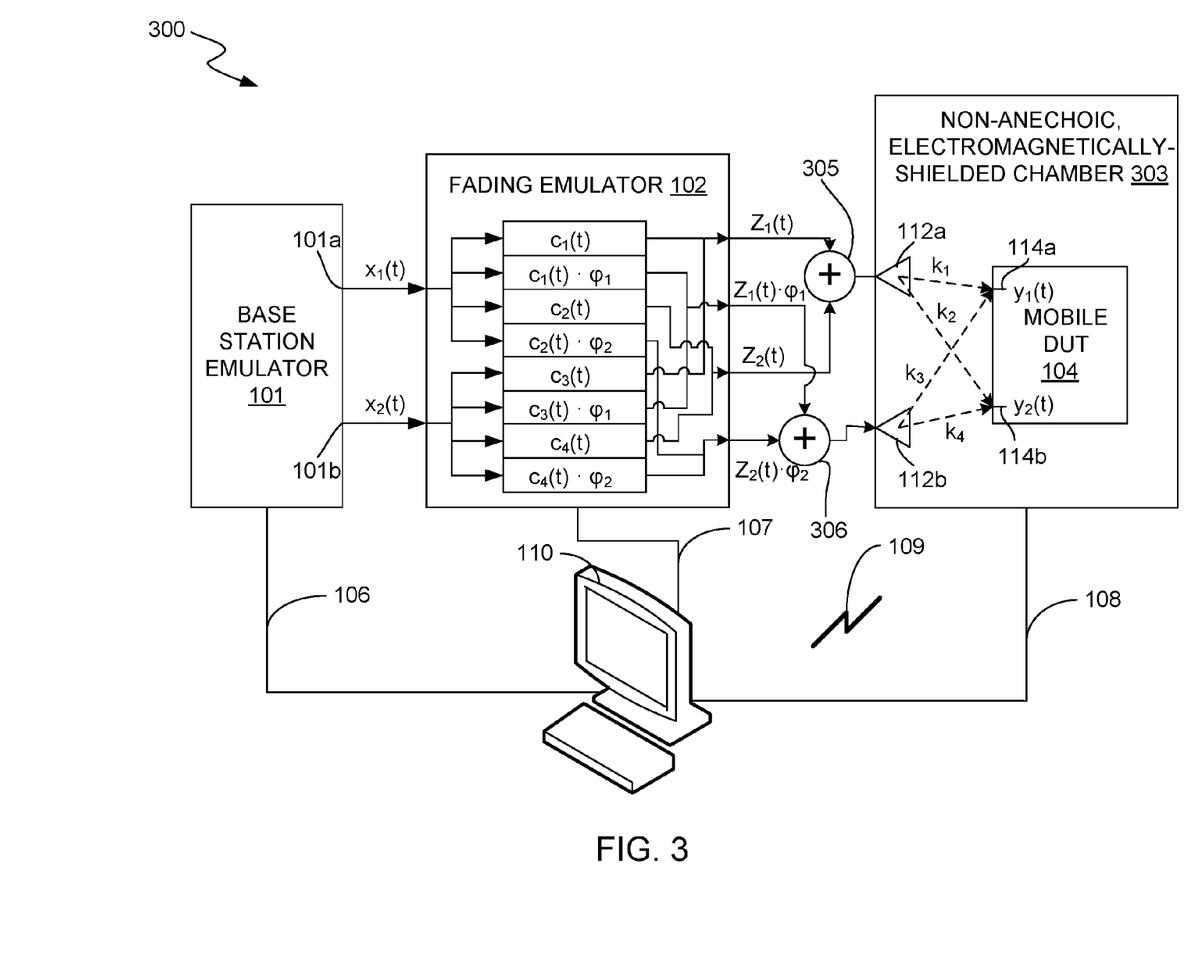
FIG. 3 illustrates a block diagram of the MIMO test system in accordance with another illustrative embodiment.

FIG. 3 illustrates a block diagram of the MIMO test system 300 in accordance with another illustrative embodiment. In accordance with this embodiment, the non-anechoic, electromagnetically-shielded chamber 303 has only N/2 probe antenna 112a and 112b. Reducing the number of probe antennas that are used in the chamber 303 can decrease the cost of the system 300. On the other hand, increasing the number of probe antennas that are used in the chamber 303 can increase test accuracy. Therefore, there may be a tradeoff between cost and accuracy.

As in the MIMO test system 100 shown in FIG. 1, the fading emulator 102 shown in FIG. 3 has N=4 output ports over which four faded, time-varying output signals, $Z_1(t)$, $Z_1(t) \cdot \phi_1$, $Z_2(t)$ and $Z_2(t) \cdot \phi_2$, are output from the respective output ports of the fading emulator 102. As in the MIMO test system 100 shown in FIG. 1, the probe antennas 112a and 112b are positioned in predetermined spatial relationships relative to the mobile DUT 104. Unlike the MIMO test system 100 shown in FIG. 1, the MIMO test system 300 shown in FIG. 3 includes first and second summers 305 and 306, respectively. The first summer 305 sums the $Z_1(t)$ and $Z_2(t)$ output signals together and the second summer 306 sums the $Z_1(t) \cdot \phi_1$ and the $Z_2(t) \cdot \phi_2$ output signals together. The output of the first summer 305 is received by the first probe antenna 112a and the output of the second summer 306 is received by the second probe antenna 112b. Due to the reduced number of probe antennas 112a and 112b used, Equation 4 above is rewritten as follows:

$$Y(t) = GZ(t) = \begin{bmatrix} k_1 + \varphi_1 k_3 & k_5 + \varphi_2 k_3 \\ k_2 + \varphi_1 k_4 & k_2 + \varphi_2 k_4 \end{bmatrix} \begin{bmatrix} z_1(t) \\ z_2(t) \end{bmatrix} \quad \text{Equation 8}$$

The calibration and actual testing processes for the MIMO testing system 300 shown in FIG. 3 may be the same as those described above with reference to the flow diagram shown in FIG. 2.

An alternative to performing the balancing process shown in block 211 of FIG. 2 and described above is to jointly optimize the values of $\phi_1$, $\phi_2$ and $a_i$ by maximizing a cost function, where $a_i \in \mathbb{R}^+$, $i=1, \ldots, 4$ are emulator output attenuation values. For example, given $a_i \in \mathbb{R}^+$, $i=1, \ldots, 4$, the following cost function can be used to jointly optimize the values of $\phi_1$, $\phi_2$ and $a_i$:

$$\max_\theta \left| w_1 \Delta_1(\theta) + w_1 \Delta_2(\theta) + \frac{w_2}{|RSRP_1(\theta) - RSRP_2(\theta)|} + w_3(RSRP_1(\theta) + RSRP_2(\theta)) \right|, \quad \text{Equation 9}$$

where $\theta$ is a parameter vector defined as $\theta = \{\phi_1, \phi_2, a_1, a_2, a_3, a_4\}$, $w_i \in \mathbb{R}^+$ are importance weights, $\Delta_1$ and $\Delta_2$ are $\Delta\phi_1$ and $\Delta\phi_2$ determined at the steps represented by blocks 205 and 209, respectively, in FIG. 2, and $RSRP_1$ and $RSRP_2$ are the average received power levels of DUT antenna elements 114a and 114b, respectively, determined at the steps represented by blocks 203 and 208 in FIG. 2, but with all of the outputs of the fading emulator 102 switched on, i.e., the steps represented by blocks 202 and 207 in FIG. 2 are eliminated. The optimization expressed by Equation 9 can be performed by the computer 110 executing a suitable optimization algorithm such as, for example, the well-known Simulated Annealing Algorithm.

Figure 4:
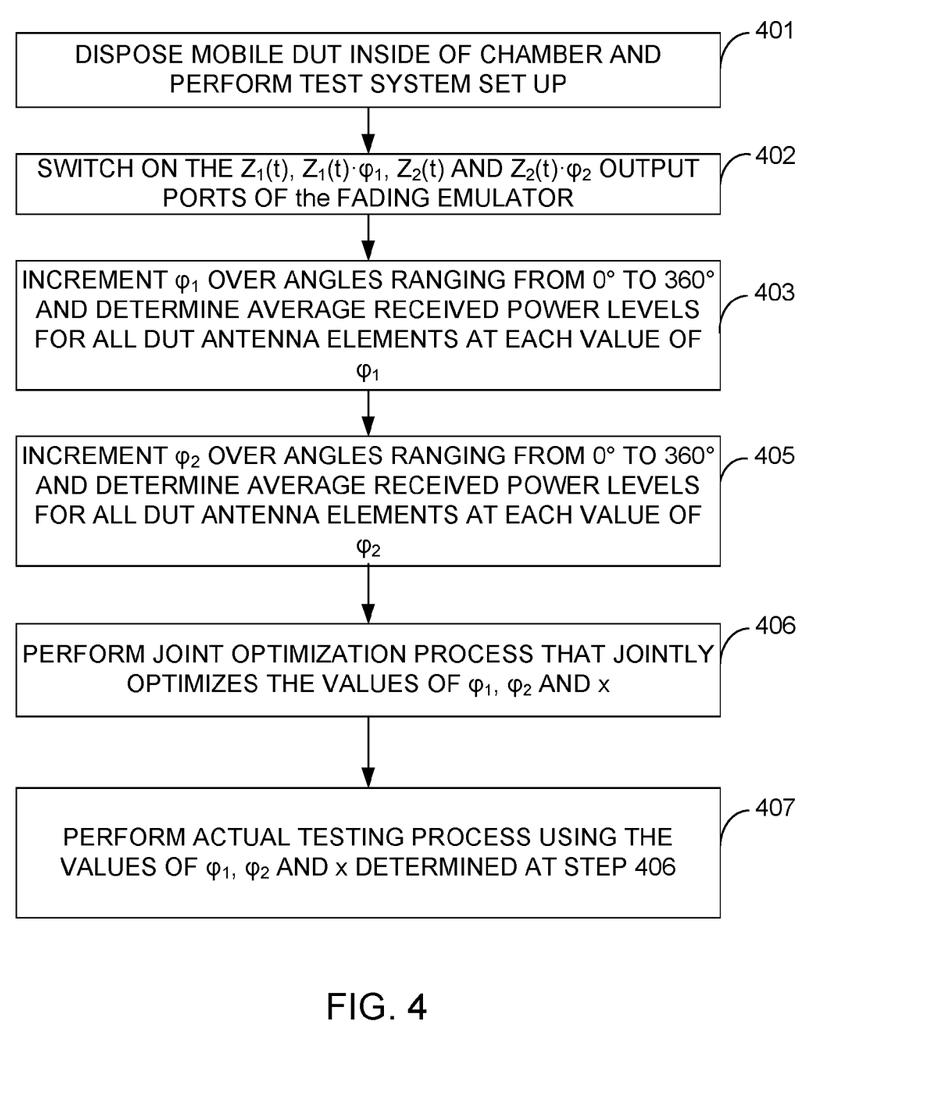
FIG. 4 illustrates a flow diagram of the calibration and actual testing processes shown in FIG. 2 modified to perform a joint optimization algorithm.

FIG. 4 illustrates a flow diagram of the calibration and actual testing processes modified to perform the joint optimization algorithm represented mathematically by Equation 9. For illustrative purposes, it will be assume that test method represented by the flow diagram of FIG. 4 is performed by the MIMO test system 100 shown in FIG. 1. The MIMO test system 100 is set up and the mobile DUT 104 is disposed inside of the non-anechoic, electromagnetically-shielded chamber 103, as indicated by block 401. The test set up process is the same as described above with reference to FIG. 2.

The $Z_1(t)$, $Z_1(t) \cdot \phi_2$, $Z_2(t)$ and $Z_2(t) \cdot \phi_2$ output ports of the fading emulator 102 are switched on, as indicated by block 402. The tunable phase term $\phi_1$ is incremented over an angular range ranging from 0° to 360° and the average received power level at each value of $\phi_1$ is determined over the entire range for each of the DUT antenna elements 114a and 114b, as indicated by block 403. The tunable phase term $\phi_2$ is incremented over an angular range ranging from 0° to 360° and the $RSRP_1$ and $RSRP_2$ values at each angle of $\phi_2$ are determined over the entire range for each of the DUT antenna elements 114a and 114b, as indicated by block 405. The computer 110 then executes a joint optimization algorithm, such as the Simulated Annealing Algorithm, that processes the $RSRP_1$ and $RSRP_2$ values obtained during the steps represented by blocks 403 and 405 to jointly determine the best values to use for $\phi_1$, $\phi_2$ and x, as indicated by block 406. The actual testing process is then performed using these values, as indicated by block 407. Because such joint optimization algorithms are well known, a detailed discussion of the manner in which joint optimization is performed is not provided herein.

It should be noted that because Equation 4 is overdetermined, it is possible that performing the method described above with reference to FIG. 2 may not always yield the best results due to G not being capable of being made close enough to the identity matrix under the current electromagnetic conditions. In such cases, the electromagnetic conditions can be altered in order to alter the channel coefficients, $k_i$. One way to alter the electromagnetic conditions is to switch the connections between the output ports of the fading emulator 102 and the probe antennas 112a-112d in order to change the output signals that are applied to the probe antennas 112a-112d. Another way to alter the electromagnetic conditions is to use a mechanical three-dimensional (3-D) positioner (not shown) inside of the chamber 103 to rotate the mobile DUT 104 into different 3-D spatial positions relative to the probe antennas 112a-112d. Yet another way to alter the electromagnetic conditions is to use one or more movable metallic stirrers (not shown) inside of the chamber 103 in a way that is similar to the way in which they are used in reverberation chambers to change electromagnetic boundary conditions. One or more of these techniques of altering the electromagnetic conditions may be used in conjunction with the methods described above with reference to FIGS. 2 and 4 to improve testing accuracy. For example, if the $\Delta\phi_1$ and $\Delta\phi_2$ values determined during the steps represented by blocks 205 and 209 are not large enough and the value of x determined during the step represented by block 211 is too large, then one or more of the above techniques for altering the electromagnetic conditions may be performed, after which the calibration process represented by blocks 201-211 is repeated.

Figure 5:
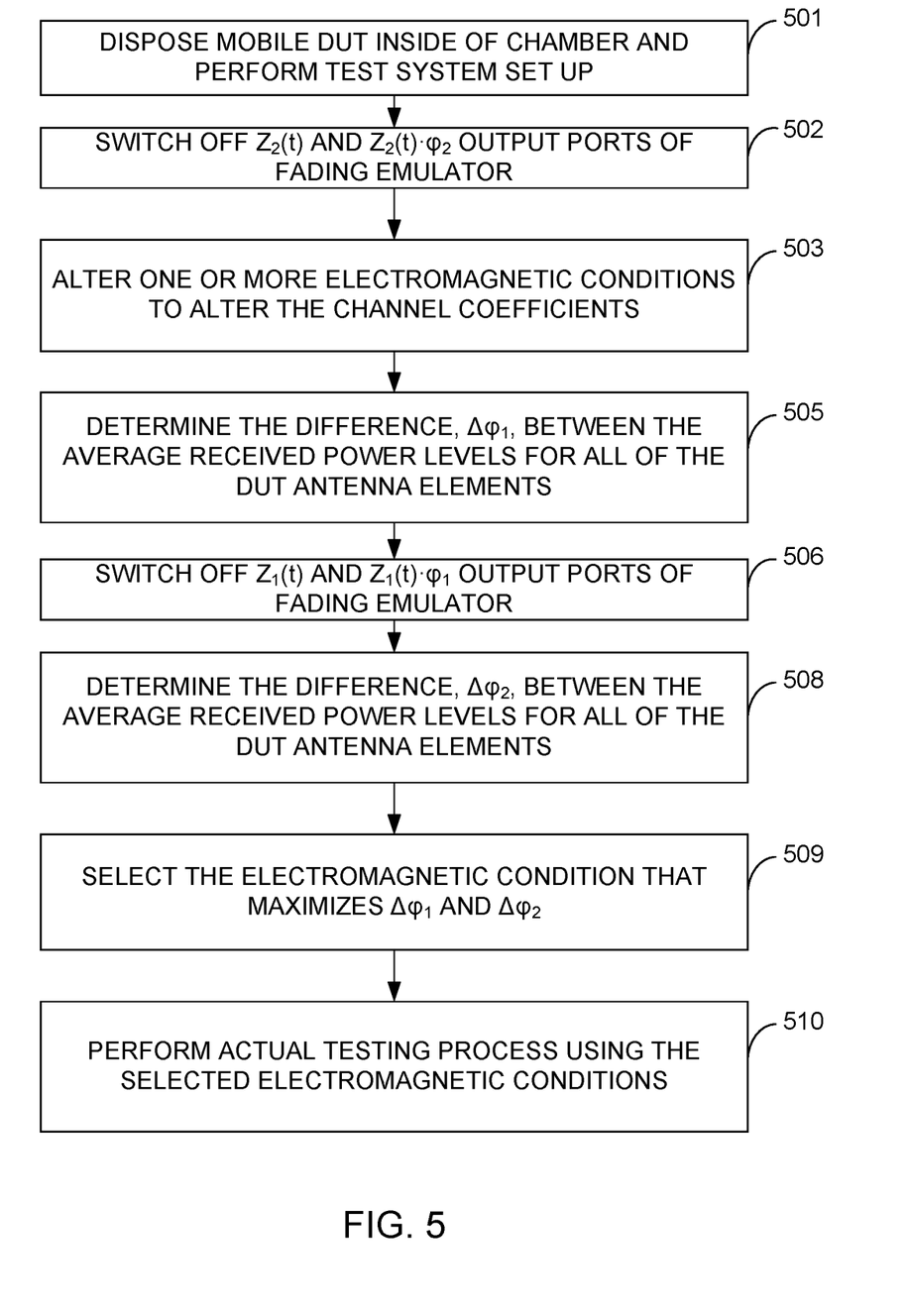
FIG. 5 illustrates a flow diagram of an alternative method to the method represented by the flow diagram shown in FIG. 2 that alters the electromagnetic conditions instead of performing phase tuning and attenuation of the output signals of the fading emulator.

It should also be noted that these techniques and devices for altering the electromagnetic conditions may be used in lieu of the phase tuning and coefficient attenuation processes described above with reference to FIG. 2 in order to calibrate and test the MIMO test system shown in illustrative form in FIGS. 1 and 3. FIG. 5 illustrates a flow diagram of an alternative method for performing the calibration by altering the electromagnetic conditions until suitable conditions are achieved. The method will be described with reference to the MIMO test system 100 shown in FIG. 1 for exemplary purposes. The steps represented by blocks 501 and 502 are the same as those represented by blocks 201 and 202, respectively, in FIG. 2. With the $Z_2(t)$ and $Z_2(t) \cdot \phi_2$ output ports of the fading emulator 102 switched off, the electromagnetic conditions are altered using one or more of the above techniques, as indicated by block 503. The average received power difference, $\Delta\phi_1$, between the $RSRP_1$ and $RSRP_2$ values is determined, as indicated by block 505. The $Z_1(t)$ and $Z_1(t) \cdot \phi_1$ output ports of the fading emulator 102 are switched off, as indicated by block 506. With the $Z_1(t)$ and $Z_1(t) \cdot \phi_1$ output ports of the fading emulator 102 switched off, the average received power difference, $\Delta\phi_2$, between the $RSRP_1$ and $RSRP_2$ is determined, as indicated by block 508.

The process represented by blocks 502 through 508 is repeated multiple times to obtain multiple $\Delta\phi_1$ and $\Delta\phi_2$ values. Each time this process is performed, the electromagnetic conditions and the associated $\Delta\phi_1$ and $\Delta\phi_2$ values are recorded in memory by the computer 110. After the process represented by blocks 502-508 has been performed a sufficient number of times, the computer 110 selects the electromagnetic conditions that maximized the $\Delta\phi_1$ and $\Delta\phi_2$ values, as indicated by block 509. The actual testing process is then performed with the selected electromagnetic conditions duplicated by the MIMO test system 100, as indicated by block 510.

Figure 6:
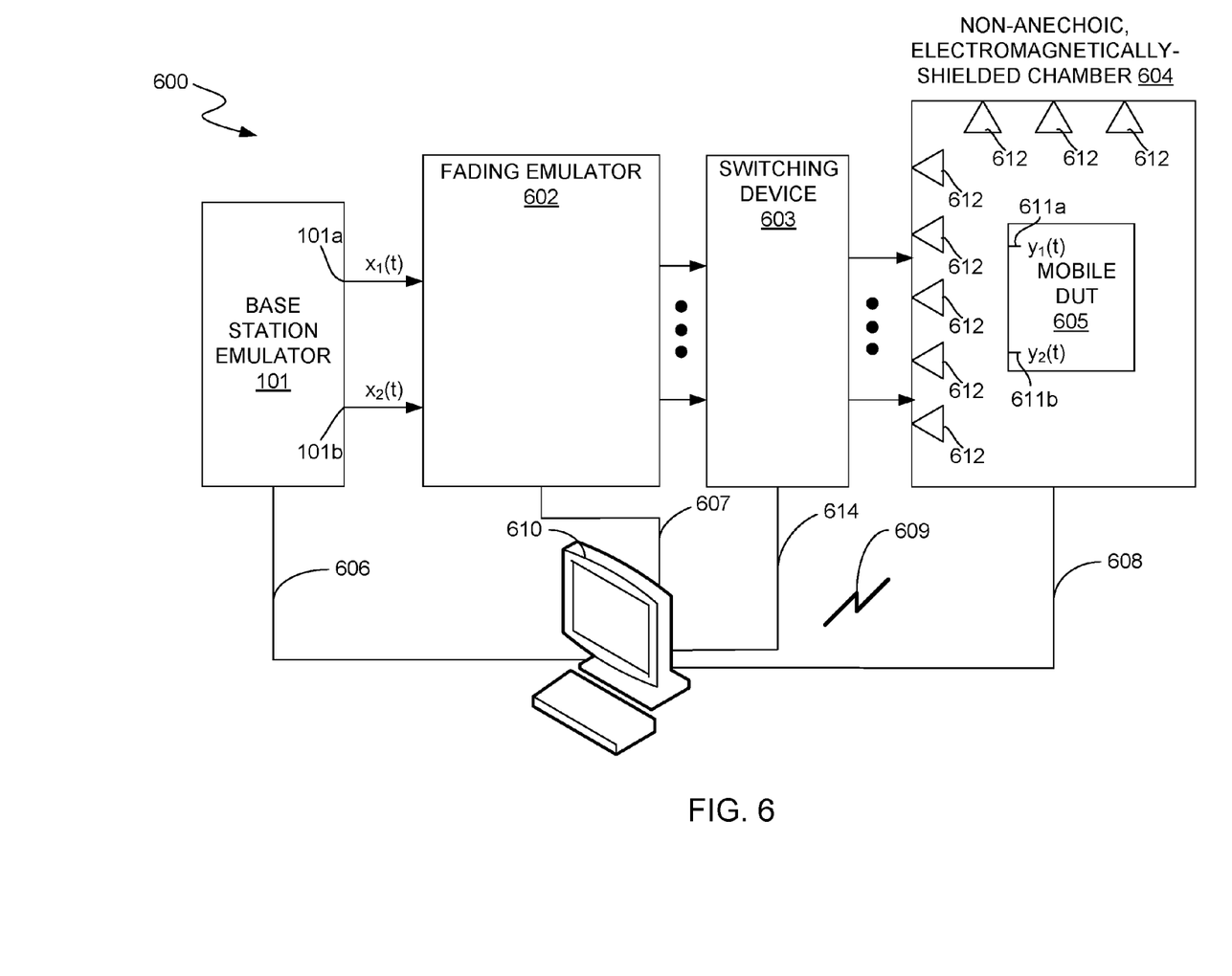
FIG. 6 illustrates a block diagram of the MIMO test system in accordance with an illustrative embodiment in which electromagnetic conditions are altered by using a switching device to switch the connections between the output ports of a fading emulator and the probe antennas.
Figure 7:
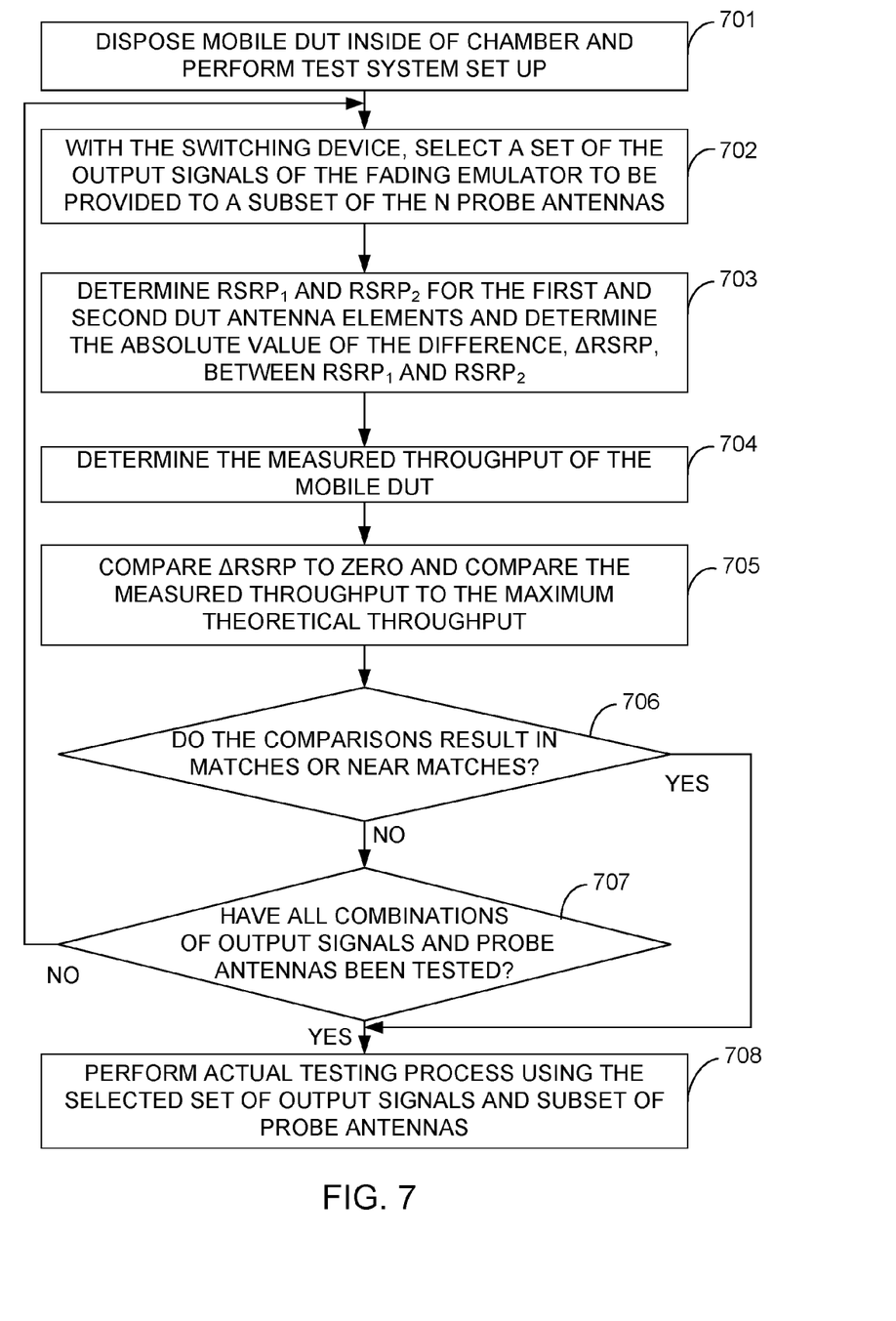
FIG. 7 illustrates a flow diagram of the method performed by the MIMO test system shown in FIG. 6 in accordance with an illustrative embodiment.

FIG. 6 illustrates a block diagram of the MIMO test system 600 in accordance with an illustrative embodiment in which the aforementioned electromagnetic conditions are altered by using a switching device 603 to switch the connections between the output ports of a fading emulator 602 and probe antennas 612 of a non-anechoic, electromagnetically-shielded chamber 604. A mobile DUT 605 is disposed inside of the chamber 604. FIG. 7 illustrates a flow diagram of the method performed by the MIMO test system 600 in accordance with an illustrative embodiment. The manner in which the MIMO test system 600 performs the method will be described with reference to FIGS. 6 and 7.

The MIMO test system 600 includes a computer 610 that may be identical to the computer 110 shown in FIGS. 1 and 3 except that the computer 610 has different or additional software and/or firmware for performing one or more algorithms of the method represented by the flow diagram of FIG. 7. The computer 610 is electrically coupled by electrical cables 606 and 607 to the base station emulator 601 and to the fading emulator 602, respectively. The computer 610 is in communication with the mobile DUT 605 via either a wired communication link, represented by line 608, or a wireless communication link, represented by wireless symbol 609. The computer 610 is in communication with the switching device 603 via electrical cable 614. As in the embodiments described above with reference to FIGS. 1-5, it is not necessary to make any connections to antenna connectors (not shown) of the mobile DUT 605. Therefore, there is no need to open up the housing of the mobile DUT 605 and risk damaging or destroying it.

In accordance with this illustrative embodiment, the fading emulator 602 has N output ports, where N is a positive integer that is greater than or equal to 2. Therefore, N faded, time-varying signals are output from the respective output ports of the fading emulator 602. The chamber 604 has R probe antennas 612, where R is a positive integer that is greater than N, and typically at least 2N. The mobile DUT 605 has a plurality of antenna elements, but for illustrative purposes is assumed to have first and second antenna elements 611a and 611b. The probe antennas 612 are positioned in predetermined spatial relationships relative to the mobile DUT 605.

With reference to FIG. 7, the step represented by block 701 is similar to the set up process described above with reference to block 201 in FIG. 2, except that the step represented by block 701 includes measuring the throughput at the DUT antenna elements 611a and 611b while adjusting the output power level of the base station emulator 102 to a constant level that is practical and that will allow the measured throughput at the mobile DUT 605 to vary over a range of from zero throughput to a maximum theoretical throughput. This is because the method of FIG. 7 relies, in part, on determining the difference between the measured throughput and the maximum theoretical throughput. Given that the modulation and coding scheme settings and the transmission mode settings of the base station emulator 101 are known, the theoretical maximum throughput can be determined. Therefore, for purposes of discussion, it is assumed that the theoretical maximum throughput has been determined a priori, and therefore does not have to be determined while performing the method of FIG. 7.

After the set up process represented by block 701 has been performed, the computer 610 causes the switching device 603 to select a set of the output signals of the fading emulator 602 to be provided to a subset of the N probe antennas 612, as indicated by block 702. Each output signal of the fading emulator 602 has a unique phase value and/or a unique gain value from those of all of the other output signals of the fading emulator 602. Making the selection of block 702 causes a particular subset of the probe antennas 612 to receive respective output signals from the fading emulator 602 that each have particular phase and gain values. Thus, each different selection of the switching device 603 will result in the mobile DUT 605 being exposed to RF signals having various gain and phase values and propagating along various propagation paths inside of the chamber 604. In this way, different selections made by the switching device 603 result in different electromagnetic conditions inside of the chamber 604.

The mobile DUT 605 measures the average received power levels of the first and second DUT antenna elements 611a and 611b, respectively, and determines the absolute value of the difference between the average received power levels, as indicated by block 703. For illustrative purposes, it will be assumed that the mobile DUT 605 measures and reports the average received power levels of the first and second DUT antenna elements 611a and 611b, respectively, as $RSRP_1$ and $RSRP_2$ values, respectively. The absolute value of the difference between these values will be referred to as the $\Delta RSRP$ value. The computer 610 records the $\Delta RSRP$ value, the set of output signals output from the fading emulator 602 that were selected by the switching device 603 and the subset of probe antennas 612 to which the output signals were provided. The manner in which the average received power levels of the DUT antenna elements are measured and the difference between them obtained and reported to the computer 610 has been described above with reference to FIG. 2.

The throughput of the mobile DUT 605 is also determined, as indicated by block 704. The selection made at block 702 that results in the highest throughput and the smallest $\Delta RSRP$ value is the one that should be used during the actual testing process. For this reason, determinations are made at block 705 as to how close the $\Delta RSRP$ value is to the zero and how close the measured throughput is to the maximum theoretical throughput. If these values are sufficiently close, then the selection made by the switching device 603 at block 702 is suitable for use during the actual testing process. For example, if the $\Delta RSRP$ value is equal to, or nearly equal to, zero, and if the measured throughput is equal to, or nearly equal to, the maximum theoretical throughput, then the selection made by the switching device 603 at block 702 is suitable for use during the actual testing process. Therefore, if a decision is made at block 706 that these values have matches or near matches, the process proceeds to block 708. At block 708, actual testing is performed using the selected set of output signals and subset of probe antennas 612 made at block 702.

If a decision is made at block 706 that these values do not match, or nearly match, then the process returns to block 702 and a different selection of output signals and subset of probe antennas 612 is made. The processes represented by blocks 703-706 are repeated until either a decision is answered affirmatively at block 706 or a decision is made at block 707 that all possible combinations of output signals from the fading emulator 602 and subsets of probe antennas 612 have been selected by the switching device at block 702. Once a determination is made at block 707 that all possible combinations have been selected by the switching device at block 702, the process proceeds to block 708. If the process proceeds to block 708 from block 707, then the computer 110 determines which of all possible combinations of output signals from the fading emulator 602 and subsets of probe antennas 612 resulted in the closest matches at block 705 and then causes that selection to be used for the actual testing process.

It should be noted that many modifications may be made to the algorithms depicted in flow diagram form in FIGS. 2, 4, 5 and 7. For example, with reference to FIG. 2, the order of blocks 202, 203 and 205 can be swapped with blocks 207, 208 and 209, respectively. With reference to FIG. 4, the order of blocks 403 and 405 can be swapped. With reference to FIG. 5, the order of blocks 502 and 506 can be swapped and the order of blocks 505 and 508 can be swapped. None of these swap changes would change the overall functionality of the algorithms.

Other types of changes to these algorithms may be made as well. For example, with reference to FIG. 7, decision block 706 could be eliminated, in which case block 708 would use the selection that resulted in the closest match determinations at block 705.

It should also be noted that a mechanical 3-D positioner (not shown) and/or a movable metallic stirrer (not shown) may be used in combination with, or in lieu of, the switching device 603, in which case the algorithm represented by FIG. 7 would be altered accordingly. For example, if a mechanical 3-D positioner and/or a movable metallic stirrer were used instead of the switching device 603, block 702 will be replaced with a block directed to positioning the 3-D positioner and/or the stirrer. In that case, all of the other blocks shown in FIG. 7 may remain unchanged. Then, whichever positioning selection results in the matches or near matches at block 706 will be used in the actual testing process at block 708. Persons of skill in the art will understand, in view of the description provided herein, how these and many other modifications may be made to the algorithms and that such modifications are within the scope of the invention.

One of the advantages of the MIMO test systems 100, 300, 600 is that they do not require anechoic chambers, which, as discussed above, are expensive and consume a large spatial area (e.g., 10 square meters of floor space). The non-anechoic, electromagnetically-shielded chambers 103, 303, 604 are relatively small, e.g., 30 centimeters (cm) in height×43 cm in width×60 cm in length. An example of a suitable, commercially-available chamber is the STE3600 enclosure offered by Ramsey Electronics of Victor, N.Y. The chambers 103, 303, 604 are not limited dimensionally, except that they must be large enough to contain the probe antennas and the mobile DUT. The chambers 103, 303, 604 also are not limited with respect to their electromagnetic characteristics except that they should provide electromagnetic shielding so that electromagnetic radiation does not escape from the chambers 103, 303, 604. The chambers 103, 303, 604 will typically be made to exhibit some amount of electromagnetic radiation absorption on their interior surfaces and some amount of electromagnetic reverberation on their interior surfaces. Persons skilled in the art will understand, in view of the disclosure provided herein, how to choose a suitable non-anechoic, electromagnetically-shielded chamber, or enclosure, for use in the test system in view of the discussion provided herein.

The computers 110 and 610 have one or more processors (not shown) configured to execute computer instructions, or code, in the form of software and/or firmware to perform one or more of the algorithms described above with reference to FIGS. 2, 4, 5 and 7. These instructions are stored in one or more memory devices that are internal to or external to the computers 110, 610. Such memory devices constitute non-transient computer-readable mediums. A variety of non-transient computer-readable mediums are suitable for use with the invention, including, for example, solid state storage devices, magnetic storage devices and optical storage devices.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A test system for testing a device under test (DUT) operating in a multiple-input multiple-output (MIMO) mode, the test system comprising:
    a base station (BS) or BS emulator configured to output a plurality of time-varying (T-V) signals;
    a fading emulator electrically coupled to the BS or BS emulator to receive the T-V signals output from the base station emulator at respective input ports of the fading emulator, the fading emulator performing fading simulation operations on input T-V signals to produce a plurality of faded T-V signals, and wherein the faded T-V signals are output from the fading emulator over respective output ports of the fading emulator;
    a non-anechoic, electromagnetically-shielded chamber electrically coupled to the fading emulator to receive the faded T-V signals from the fading emulator, the DUT being disposed in the chamber and having a plurality of antenna elements electrically coupled to respective antenna ports of the DUT;
    a plurality of probe antennas disposed in the chamber, the probe antennas emitting respective radio frequency (RF) signals in response to being driven by the faded T-V signals; and
    a computer that is in communication with the DUT without a wired connection to the antenna ports of the DUT, the computer receiving information reported by the DUT relating to measurements of power received by the antenna elements of the DUT, processing the received information to calibrate the test system and then causing the DUT to be tested by the calibrated test system to determine at least one performance criteria of the DUT.

2. The test system of claim 1, wherein the chamber is at least partially echoic.

3. The test system of claim 2, wherein the chamber includes an electromagnetically-absorbing material on inner surfaces of the chamber that prevents a box from being fully reverberant.

4. The test system of claim 1, wherein to calibrate the test system, the computer performs a calibration algorithm that processes the information to select an attenuation coefficient value to be used to attenuate one or more of the faded T-V signals used to drive one or more of the probe antennas.

5. The test system of claim 4, wherein the calibration algorithm also processes the information to select phase terms to be used to adjust a phase of one or more of the faded T-V signals used to drive one or more of the probe antennas.

6. The test system of claim 5, wherein N faded T-V signals are output from N output ports, respectively, of the fading emulator, where N is a positive integer that is greater than or equal to 4, and wherein k probe antennas are disposed in the chamber, where k is a positive integer that is greater than or equal to 4, and wherein the DUT has at least first and second antenna elements.

7. The test system of claim 6, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:
   turning off the output ports of the fading emulator over which the second faded T-V signal and the second faded T-V, P-S signal are output from the fading emulator;
   turning on the output ports of the fading emulator over which the first faded T-V signal and the first faded T-V, P-S signal are output from the fading emulator;
   incrementing the first phase value $\phi_1$ over angles ranging from 0 degrees to 360 degrees and measuring an average received power at the first and second antenna elements of the DUT, Reference Signal Received Power 1 $(RSRP_1)(\phi 1)$ and Reference Signal Received Power 2 $(RSRP_2)(\phi 1)$, respectively, at each incremented angle of the first phase value $\phi_1$;
   calculating a difference value, $\Delta(\phi 1)$, between the $RSRP_1$ $(\phi 1)$ and $RSRP_2(\phi 1)$ for each incremented angle of $\phi_1$;
   selecting the first phase value $\phi_1$ that resulted a maximum difference value, $\Delta(\phi 1)max$, between $RSRP_1(\phi_1)$ and $RSRP_2(\phi_1)$;
   turning off the output ports of the fading emulator over which the first faded T-V signal and the first faded T-V, P-S signal are output from the fading emulator;
   turning on the output ports of the fading emulator over which the second faded T-V signal and the second faded T-V, P-S signal are output from the fading emulator;
   incrementing the second phase value $\phi_2$ over angles ranging from 0 degrees to 360 degrees and measuring an average received power at the first and second antenna elements of the DUT, $RSRP_1(\phi_2)$ and $RSRP_2$ $(\phi_2)$, respectively, at each incremented angle of the second phase value $\phi_2$;
   calculating a difference value, $\Delta(\phi_2)$, between the $RSRP_1$ $(\phi_2)$ and $RSRP_2(\phi_2)$ for each incremented angle of $\phi_2$;
   selecting the second phase value $\phi_2$ that resulted in a maximum difference value, $\Delta(\phi_2)max$, between the $RSRP_1(\phi_2)$ and $RSRP_2(\phi_2)$; and
   selecting the attenuation coefficient value, x, that produces a closest balance between the average received power measurement, $RSRP_1$, for the first antenna of the DUT, and the average received power measurement, $RSRP_2$, for the second antenna of the DUT, when using the selected first and second values of $\phi_1$ and $\phi_2$, respectively, in the fading emulator.

8. The test system of claim 7, wherein after the calibration algorithm has been performed and the attenuation coefficient value, x, and the first and second phase values, $\phi_1$ and $\phi_2$, respectively, have been selected, the calibrated test system performs actual testing of the DUT using the selected attenuation coefficient value, x, and the selected first and second phase values, $\phi_1$ and $\phi_2$, respectively, to attenuate and tune the phase of one or more of the faded T-V signals that are output from the fading emulator and used to drive one or more of the probe antennas.

9. The test system of claim 8, further comprising:
   a switch that electrically couples the fading emulator to the chamber, wherein the calibration algorithm is performed multiple times, and wherein at least once after the calibration algorithm is performed, the switch reconfigures the electrical coupling between the fading emulator and the chamber to change the faded T-V signals that are used to drive the probe antennas.

10. The test system of claim 8, further comprising:
   a mechanical three-dimensional positioner mechanically coupled to the DUT, wherein the calibration algorithm is performed multiple times, and wherein at least once after the calibration algorithm is performed, the positioner repositions the DUT.

11. The test system of claim 8, further comprising:
   one or more movable metallic stirrers disposed in the chamber, wherein the calibration algorithm is performed multiple times, and wherein at least once after the calibration algorithm is performed, said one or more metallic stirrers are repositioned to alter a reverberation characteristic of the chamber.

12. The test system of claim 4, wherein N faded T-V signals are output from N output ports, respectively, of the fading emulator, where N is a positive integer that is greater than or equal to 4, and wherein k probe antennas are disposed in the chamber, where k is a positive integer that is greater than or equal to 2, and wherein the DUT has at least first and second antenna elements.

13. The test system of claim 12, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, the test system further comprising:
   at least first and second summers, the first summer summing the first faded T-V signal and the second faded T-V signal to produce a first summed signal, the second summer summing the first faded T-V, P-S signal and the second faded T-V, P-S signal to produce a second summed signal, the first summed signal being used to drive the first antenna probe and the second summed signal being used to drive the second antenna probe.

14. The test system of claim 13, wherein the calibration algorithm comprises:
   turning off the output ports of the fading emulator over which the second faded T-V signal and the second faded, T-V, P-S signal are output from the fading emulator;
   turning on the output ports of the fading emulator over which the first faded T-V signal and the first faded T-V, P-S signal are output from the fading emulator;
   incrementing the first phase value $\phi_1$ over angles ranging from 0 degrees to 360 degrees and measuring an average received power at the first and second antenna elements of the DUT, Reference Signal Received Power 1 $(RSRP_1)(\phi 1)$ and Reference Signal Received Power 2 (RSRP$_2$)($\phi$1), respectively, at each incremented angle of the first phase value $\phi_1$;

calculating a difference value, $\Delta(\phi1)$, between the RSRP$_1$ ($\phi$1) and RSRP$_2$($\phi$1) for each incremented angle of $\phi_1$;

selecting the first phase value $\phi_1$ that resulted a maximum difference value, $\Delta(\phi1)$max, between RSRP$_1$($\phi_1$) and RSRP$_2$($\phi_1$);

turning off the output ports of the fading emulator over which the first faded T-V signal and the first faded, T-V, P-S signal are output from the fading emulator;

turning on the output ports of the fading emulator over which the second faded T-V signal and the second faded T-V, P-S signal are output from the fading emulator;

incrementing the second phase value $\phi_2$ over angles ranging from 0 degrees to 360 degrees and measuring an average received power at the first and second antenna elements of the DUT, RSRP$_1$($\phi_2$) and RSRP$_2$ ($\phi_2$), respectively, at each incremented angle of the second phase value $\phi_2$;

calculating a difference value, $\Delta(\phi_2)$, between the RSRP$_1$ ($\phi_2$) and RSRP$_2$($\phi_2$) for each incremented angle of $\phi_2$;

selecting the second phase value $\phi_2$ that resulted in a maximum difference value, $\Delta(\phi_2)$max, between the RSRP$_1$($\phi_2$) and RSRP$_2$($\phi_2$); and selecting the attenuation coefficient value, x, that produces a closest balance between the average received power measurement, RSRP$_1$, for the first antenna of the DUT, and the average received power measurement, RSRP$_2$, for the second antenna of the DUT, when using the selected first and second values of $\phi_1$ and $\phi_2$, respectively, in the fading emulator.

15. The test system of claim 14, wherein after the calibration algorithm has been performed and the attenuation coefficient value, x, and the first and second phase values, $\phi_1$ and $\phi_2$, respectively, have been selected, the calibrated test system performs actual testing of the DUT by using the selected attenuation coefficient value, x, and the selected first and second phase values, $\phi_1$ and $\phi_2$, respectively, to attenuate and tune the phase of one or more of the signals that are output from the fading emulator and used to drive one or more of the probe antennas.

16. The test system of claim 15, further comprising:
a switch that electrically couples the fading emulator to the chamber, wherein the calibration algorithm is performed multiple times, and wherein at least once after the calibration algorithm is performed, the switch reconfigures the electrical coupling between the fading emulator and the chamber to change the signals output from the fading emulator that are used to drive the probe antennas.

17. The test system of claim 15, further comprising:
a mechanical three-dimensional positioner mechanically coupled to the DUT, wherein the calibration algorithm is performed multiple times, and wherein at least once after the calibration algorithm is performed, the positioner repositions the DUT.

18. The test system of claim 15, further comprising:
one or more movable metallic stirrers disposed in the chamber, wherein the calibration algorithm is performed multiple times, and wherein at least once after the calibration algorithm is performed, said one or more metallic stirrers are repositioned to alter a reverberation characteristic of the chamber.

19. The test system of claim 6, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:

turning on the output ports of the fading emulator over which the first and second faded T-V signals and the first and second faded T-V, P-S signals are output from the fading emulator;

incrementing the first phase value $\phi_1$ over angles ranging from 0 degrees to 360 degrees and measuring an average received power at the first and second antenna elements of the DUT, Reference Signal Received Power 1 (RSRP$_1$)($\phi$1) and Reference Signal Received Power 2 (RSRP$_2$)($\phi$1), respectively, at each incremented angle of the first phase value $\phi_1$;

incrementing the second phase value $\phi_2$ over angles ranging from 0 degrees to 360 degrees and measuring an average received power at the first and second antenna elements of the DUT, RSRP$_1$($\phi_2$) and RSRP$_2$ ($\phi_2$), respectively, at each incremented angle of the second phase value $\phi_2$; and performing a joint optimization algorithm that processes RSRP$_1$($\phi_1$), RSRP$_2$($\phi_1$), RSRP$_1$($\phi_2$), and RSRP$_2$($\phi_2$) to determine values for $\phi_1$, $\phi_2$ and an attenuation coefficient, x.

20. The test system of claim 19, wherein after the calibration algorithm has been performed and the attenuation coefficient value, x, and the first and second phase values, $\phi_1$ and $\phi_2$, respectively, have been determined, the calibrated test system performs actual testing of the DUT by using the determined attenuation coefficient value, x, and the determined first and second phase values, $\phi_1$ and $\phi_2$, respectively, to attenuate and tune the phase of one or more of the faded T-V signals that are output from the fading emulator and used to drive one or more of the probe antennas.

21. The test system of claim 6, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:

for different sets of electromagnetic conditions to which the DUT is subjected in the chamber:
turning off the output ports of the fading emulator over which the second faded T-V signal and the second faded T-V, P-S signal are output from the fading emulator;

turning on the output ports of the fading emulator over which the first faded T-V signal and the first faded T-V, P-S signal are output from the fading emulator;

measuring an average received power at the first and second antenna elements of the DUT, Reference Signal Received Power 1 (RSRP$_1$)($\phi$1) and Reference Signal Received Power 2 (RSRP$_2$)($\phi$1), respectively;

calculating a difference value, $\Delta(\phi1)$, between the RSRP$_1$($\phi$1) and RSRP$_2$($\phi$1);

turning off the output ports of the fading emulator over which the first faded T-V signal and the first faded T-V, P-S signal are output from the fading emulator;

turning on the output ports of the fading emulator over which the second faded T-V signal and the second faded T-V, P-S signal are output from the fading emulator;

measuring an average received power at the first and second antenna elements of the DUT, $RSRP_1(\phi_2)$ and $RSRP_2(\phi_2)$, respectively;

calculating a difference value, $\Delta(\phi_2)$, between the $RSRP_1(\phi_2)$ and $RSRP_2(\phi_2)$ for each of said second phase values of $\phi_2$; and selecting the set of electromagnetic conditions that resulted in a maximum difference value between $RSRP_1(\phi_1)$ and $RSRP_2(\phi_1)$ and a maximum difference value between $RSRP_1(\phi_2)$ and $RSRP_2(\phi_2)$.

22. The test system of claim 21, wherein after the calibration algorithm has been performed and the set of electromagnetic conditions has been selected, the calibrated test system performs actual testing of the DUT by using the selected electromagnetic conditions.

23. A test system for testing a device under test (DUT) operating in a multiple-input multiple-output (MIMO) mode, the test system comprising:
  a base station (BS) or BS emulator configured to output a plurality of time-varying (T-V) signals;
  a fading emulator electrically coupled to the BS or BS emulator to receive the T-V signals output from the BS or BS emulator at respective input ports of the fading emulator, the fading emulator performing fading simulation operations on input T-V signals to produce a plurality of faded T-V signals, and wherein the faded T-V signals are output from the fading emulator over respective output ports of the fading emulator;
  a non-anechoic, electromagnetically-shielded chamber, the DUT being disposed in the chamber and having a plurality of antenna elements electrically coupled to respective antenna ports of the DUT;
  a plurality of probe antennas disposed in the chamber and electrically interconnected with a switching device, the probe antennas emitting respective radio frequency (RF) signals in response to being driven by the faded T-V signals;
  a switching device electrically coupled to the output ports of the fading emulator and to the probe antennas, the switching device selecting a set of the faded T-V signals output from the fading emulator to be provided to a subset of the probe antennas; and
  a computer that is in communication with the DUT and with the switching device, the computer receiving information relating to measurements of power received by the antenna elements of the DUT and measured throughput of the DUT, performing a calibration process that causes the switching device to select different sets of the faded T-V signals to be provided to different subsets of the probe antennas while determining merits of each set based on the information, and causing actual testing of the DUT to be performed using a selected one of the sets.

24. The test system of claim 23, wherein the information received by the computer includes reference signal received power (RSRP) values for at least first and second antenna elements of the DUT, $RSRP_1$ and $RSRP_2$, respectively.

25. The test system of claim 24, wherein the computer determines merits of each set based at least in part on how close a magnitude of a difference between $RSRP_1$ and $RSRP_2$, $\Delta RSRP$, is to zero.

26. The test system of claim 25, wherein the computer determines merits of each set based at least in part on a determination of how close the measured throughput is to a maximum theoretical throughput.

27. A method for calibrating and using a test system for testing a device under test (DUT) operating in a multiple-input multiple-output (MIMO) mode, the method comprising:
  with a base station (BS) or BS emulator, outputting a plurality of time-varying (T-V) signals;
  with a fading emulator, receiving the T-V signals and performing fading simulation operations on the received T-V signals to produce a plurality of faded T-V signals;
  outputting the faded T-V signals from the fading emulator over respective output ports of the fading emulator;
  disposing the DUT in a non-anechoic, electromagnetically-shielded chamber, the DUT being disposed in the chamber and having a plurality of antenna elements electrically coupled to respective antenna ports of the DUT;
  driving a plurality of probe antennas disposed in the chamber with the faded T-V signals, the probe antennas emitting respective radio frequency (RF) signals in response to being driven by the faded T-V signals; and
  with a computer, receiving information reported by the DUT relating to measurements of power received by the antenna elements of the DUT, processing the information to calibrate the test system and then causing the DUT to be tested by the calibrated test system to determine at least one performance criteria of the DUT.

28. The method of claim 27, wherein as part of processing the information to calibrate the test system, the computer performs a calibration algorithm that processes the information to select an attenuation coefficient value to be used to attenuate one or more of the faded T-V signals used to drive one or more of the probe antennas.

29. The method of claim 28, wherein the calibration algorithm also processes the information to select phase terms to be used to adjust a phase of one or more of the faded T-V signals used to drive one or more of the probe antennas.

30. The method of claim 29, wherein N faded T-V signals are output from N output ports, respectively, of the fading emulator, where N is a positive integer that is greater than or equal to 4, and wherein k probe antennas are disposed in the chamber, where k is a positive integer that is greater than or equal to 4, and wherein the DUT has at least first and second antenna elements.

31. The method of claim 30, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:
  turning off the output ports of the fading emulator over which the second faded T-V signal and the second faded T-V, P-S signal are output from the fading emulator;
  turning on the output ports of the fading emulator over which the first faded T-V signal and the first faded T-V, P-S signal are output from the fading emulator;
  incrementing the first phase value $\phi_1$ over angles ranging from 0 degrees to 360 degrees and measuring an average received power at the first and second antenna elements of the DUT, Reference Signal Received Power 1 $(RSRP_1)(\phi1)$ and Reference Signal Received Power 2 $(RSRP_2)(\phi1)$, respectively, at each incremented angle of the first phase value $\phi_1$;

calculating a difference value, $\Delta(\phi1)$, between the $RSRP_1$ ($\phi1$) and $RSRP_2(\phi1)$ for each incremented angle of $\phi_1$;
selecting the first phase value $\phi_1$ that resulted a maximum difference value, $\Delta(\phi1)$max, between $RSRP_1(\phi_1)$ and $RSRP_2(\phi_1)$;
turning off the output ports of the fading emulator over which the first faded T-V signal and the first faded T-V, P-S signal are output from the fading emulator;
turning on the output ports of the fading emulator over which the second faded T-V signal and the second faded T-V, P-S signal are output from the fading emulator;
incrementing the second phase value $\phi_2$ over angles ranging from 0 degrees to 360 degrees and measuring an average received power at the first and second antenna elements of the DUT, $RSRP_1(\phi_2)$ and $RSRP_2(\phi_2)$, respectively, at each incremented angle of the second phase value $\phi_2$;
calculating a difference value, $\Delta(\phi_2)$, between the $RSRP_1(\phi_2)$ and $RSRP_2(\phi_2)$ for each incremented angle of $\phi_2$;
selecting the second phase value $\phi_2$ that resulted in a maximum difference value, $\Delta(\phi_2)$max, between the $RSRP_1(\phi_2)$ and $RSRP_2(\phi_2)$; and
selecting the attenuation coefficient value, x, that produces a closest balance between the average received power measurement, $RSRP_1$, for the first antenna of the DUT, and the average received power measurement, $RSRP_2$, for the second antenna of the DUT, when using the selected first and second values of $\phi_1$ and $\phi_2$, respectively, in the fading emulator.

32. The method of claim 28, wherein N faded T-V signals are output from N output ports, respectively, of the fading emulator, where N is a positive integer that is greater than or equal to 4, and wherein k probe antennas are disposed in the chamber, where k is a positive integer that is greater than or equal to 2, and wherein the DUT has at least first and second antenna elements.

33. The method of claim 32, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, the method further comprising:
prior to the step of driving a plurality of probe antennas:
using a first summer to sum the first faded T-V signal and the second faded T-V signal to produce a first summed signal; and
using a second summer to sum the first faded T-V, P-S signal and the second faded T-V, P-S signal to produce a second summed signal;
and
during the step of driving a plurality of probe antennas:
using the first summed signal to drive a first antenna probe; and
using the second summed signal to drive a second antenna probe.

34. The method of claim 33, wherein the calibration algorithm comprises:
turning off the output ports of the fading emulator over which the second faded T-V signal and the second faded, T-V, P-S signal are output from the fading emulator;
turning on the output ports of the fading emulator over which the first faded T-V signal and the first faded T-V, P-S signal are output from the fading emulator;
incrementing the first phase value $\phi_1$ over angles ranging from 0 degrees to 360 degrees and measuring an average received power at the first and second antenna elements of the DUT, Reference Signal Received Power 1 $(RSRP_1)(\phi1)$ and Reference Signal Received Power 2 $(RSRP_2)(\phi1)$, respectively, at each incremented angle of the first phase value $\phi_1$;
calculating a difference value, $\Delta(\phi1)$, between the $RSRP_1$ ($\phi1$) and $RSRP_2(\phi1)$ for each incremented angle of $\phi_1$;
selecting the first phase value $\phi_1$ that resulted a maximum difference value, $\Delta(\phi1)$max, between $RSRP_1(\phi_1)$ and $RSRP_2(\phi_1)$;
turning off the output ports of the fading emulator over which the first faded T-V signal and the first faded, T-V, P-S signal are output from the fading emulator;
turning on the output ports of the fading emulator over which the second faded T-V signal and the second faded T-V, P-S signal are output from the fading emulator;
incrementing the second phase value $\phi_2$ over angles ranging from 0 degrees to 360 degrees and measuring an average received power at the first and second antenna elements of the DUT, $RSRP_1(\phi_2)$ and $RSRP_2(\phi_2)$, respectively, at each incremented angle of the second phase value $\phi_2$;
calculating a difference value, $\Delta(\phi_2)$, between the $RSRP_1(\phi_2)$ and $RSRP_2(\phi_2)$ for each incremented angle of $\phi_2$;
selecting the second phase value $\phi_2$ that resulted in a maximum difference value, $\Delta(\phi_2)$max, between the $RSRP_1(\phi_2)$ and $RSRP_2(\phi_2)$; and
selecting the attenuation coefficient value, x, that produces a closest balance between the average received power measurement, $RSRP_1$, for the first antenna of the DUT, and the average received power measurement, $RSRP_2$, for the second antenna of the DUT, when using the selected first and second values of $\phi_1$ and $\phi_2$, respectively, in the fading emulator.

35. The method of claim 30, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:
turning on the output ports of the fading emulator over which the first and second faded T-V signals and the first and second faded T-V, P-S signals are output from the fading emulator;
incrementing the first phase value $\phi_1$ over angles ranging from 0 degrees to 360 degrees and measuring an average received power at the first and second antenna elements of the DUT, Reference Signal Received Power 1 $(RSRP_1)(\phi1)$ and Reference Signal Received Power 2 $(RSRP_2)(\phi1)$, respectively, at each incremented angle of the first phase value $\phi_1$;
incrementing the second phase value $\phi_2$ over angles ranging from 0 degrees to 360 degrees and measuring an average received power at the first and second antenna elements of the DUT, $RSRP_1(\phi_2)$ and $RSRP_2(\phi_2)$, respectively, at each incremented angle of the second phase value $\phi_2$; and
performing a joint optimization algorithm that processes $RSRP_1(\phi_1)$, $RSRP_2(\phi_1)$, $RSRP_1(\phi_2)$, and $RSRP_2(\phi_2)$ to determine values for $\phi_1$, $\phi_2$ and an attenuation coefficient, x.

36. The method of claim 30, wherein the N faded T-V signals include at least first and second faded T-V signals and first and second faded T-V, phase-shifted (P-S) signals, wherein the first faded T-V, P-S signal is phase shifted by a first phase value, $\phi_1$, from the first faded T-V signal, and wherein the second faded T-V, P-S signal is phase shifted by a second phase value, $\phi_2$, from the second faded T-V signal, and wherein the calibration algorithm comprises:

for different sets of electromagnetic conditions to which the DUT is subjected in the chamber:

turning off the output ports of the fading emulator over which the second faded T-V signal and the second faded T-V, P-S signal are output from the fading emulator;

turning on the output ports of the fading emulator over which the first faded T-V signal and the first faded T-V, P-S signal are output from the fading emulator;

measuring an average received power at the first and second antenna elements of the DUT, Reference Signal Received Power 1 $(RSRP_1)(\phi 1)$ and Reference Signal Received Power 2 $(RSRP_2)(\phi 1)$, respectively;

calculating a difference value, $\Delta(\phi 1)$, between the $RSRP_1(\phi 1)$ and $RSRP_2(\phi 1)$;

turning off the output ports of the fading emulator over which the first faded T-V signal and the first faded T-V, P-S signal are output from the fading emulator;

turning on the output ports of the fading emulator over which the second faded T-V signal and the second faded T-V, P-S signal are output from the fading emulator;

measuring an average received power at the first and second antenna elements of the DUT, $RSRP_1(\phi_2)$ and $RSRP_2(\phi_2)$, respectively;

calculating a difference value, $\Delta(\phi_2)$, between the $RSRP_1(\phi_2)$ and $RSRP_2(\phi_2)$ for each of said second phase values of $\phi_2$; and selecting the set of electromagnetic conditions that resulted in a maximum difference value between $RSRP_1(\phi_1)$ and $RSRP_2(\phi_1)$ and a maximum difference value between $RSRP_1(\phi_2)$ and $RSRP_2(\phi_2)$.

37. A method for calibrating and using a test system for testing a device under test (DUT) operating in a multiple-input multiple-output (MIMO) mode, the method comprising:

with a base station (BS) or BS emulator, outputting a plurality of time-varying (T-V) signals;

with a fading emulator, receiving the T-V signals and performing fading simulation operations on the received T-V signals to produce a plurality of faded T-V signals;

outputting the faded T-V signals from the fading emulator over respective output ports of the fading emulator;

disposing the DUT in a non-anechoic, electromagnetically-shielded chamber, the DUT being disposed in the chamber and having a plurality of antenna elements electrically coupled to respective antenna ports of the DUT;

with a switching device, selecting a set of the faded T-V signals output from the fading emulator to be provided to a subset of the plurality of probe antennas disposed in the chamber and electrically interconnected with the switching device, the plurality of probe antennas emitting respective radio frequency (RF) signals in response to being driven by the faded T-V signals; and with a computer that is in communication with the DUT and with the switching device, receiving information relating to measurements of power received by the antenna elements of the DUT and measured throughput of the DUT, performing a calibration process that causes the switching device to select different sets of the faded T-V signals to be provided to different subsets of the plurality of probe antennas while determining merits of each set based on the information, and causing actual testing of the DUT to be performed using a selected one of the sets.

38. The method of claim 37, wherein the information received by the computer includes reference signal received power (RSRP) values for at least first and second antenna elements of the DUT, $RSRP_1$ and $RSRP_2$, respectively.

39. The method of claim 38, wherein the computer determines merits of each set based at least in part on how close a magnitude of a difference between $RSRP_1$ and $RSRP_2$, $\Delta RSRP$, is to zero.

40. The method of claim 39, wherein the computer determines merits of each set based at least in part on a determination of how close the measured throughput is to a maximum theoretical throughput.

* * * * *